June 9, 1925.                                                    1,541,026
A. R. BLEWETT
TRACTOR MACHINE
Filed April 27, 1920          2 Sheets-Sheet 2

Inventor
Arthur R. Blewett

Attorney

Patented June 9, 1925.

1,541,026

UNITED STATES PATENT OFFICE.

ARTHUR R. BLEWETT, OF TACOMA, WASHINGTON, ASSIGNOR TO THE BLEWETT TRACTOR COMPANY, OF TACOMA, WASHINGTON.

TRACTOR MACHINE.

Application filed April 27, 1920. Serial No. 376,920.

*To all whom it may concern:*

Be it known that I, ARTHUR R. BLEWETT, a citizen of the United States, residing at Tacoma, in the county of Pierce and State of Washington, have invented certain new and useful Improvements in Tractor Machines, of which the following is a specification.

The present invention relates to improvements in tractor machines and especially to the wheel substitute in the form of a driving, endless, portable track, one of which is located at each side of the tractor machine, and both of which are actuated from a single driving shaft through a pair of driving sprockets located in the longitudinal center of the portable track between the two end track supporting wheels of the driving or traction members of the machine.
The essential feature of primary importance in the invention resides in the construction whereby the driving sprocket, centrally located, is capable of a rolling movement on the track at the pitch diameter of the sprocket or driving wheel, and this rolling of the sprocket wheel on the track, on the pitch diameter of the wheel, prevents or eliminates possibility of slipping of the driving sprocket on the track, and insures a direct application of power from the sprocket wheel to the portable track without loss of motion or power.

The drawings illustrate one complete example of the physical embodiment of the center drive wheel substitute or traction member in which the parts are combined and arranged according to the best mode I have so far devised for the practical application of the principles of my invention.
Figure 1 is a view in side elevation of a wheel substitute or traction drive member embodying my invention, one of which is located at each side the tractor machine, and both actuated from a common driving shaft with its power applied at the longitudinal center of the traction member.

Figure 1:
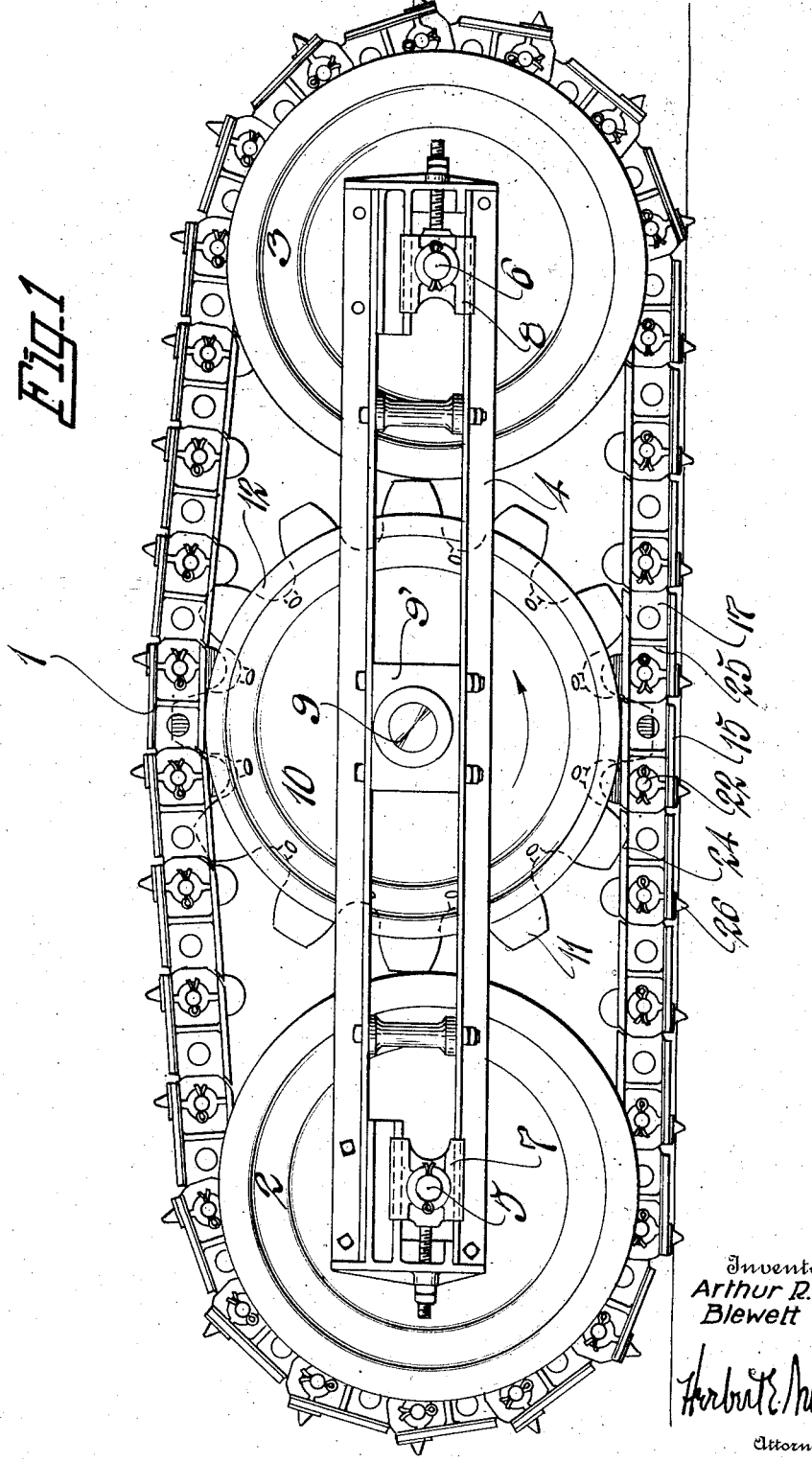

In order that a clear understanding of the application of the principles of my invention may be secured, I have illustrated in Figure 1 a side view of one of the traction members or wheel substitutes, one of which is located at each side of the tractor machine, and it involves the utilization of a portable, endless, track or belt indicated as a whole by the numeral 1, adapted to travel over the front and rear wheels or pulleys 2 and 3 which are grooved to accommodate the endless track in usual manner.

The wheels 2 and 3 are supported in the side frame 4, horizontally located and provided with longitudinally adjustable shafts 5 and 6 journaled in the bearings 7 and 8 movable in the frame in well known manner.

Figure 2:
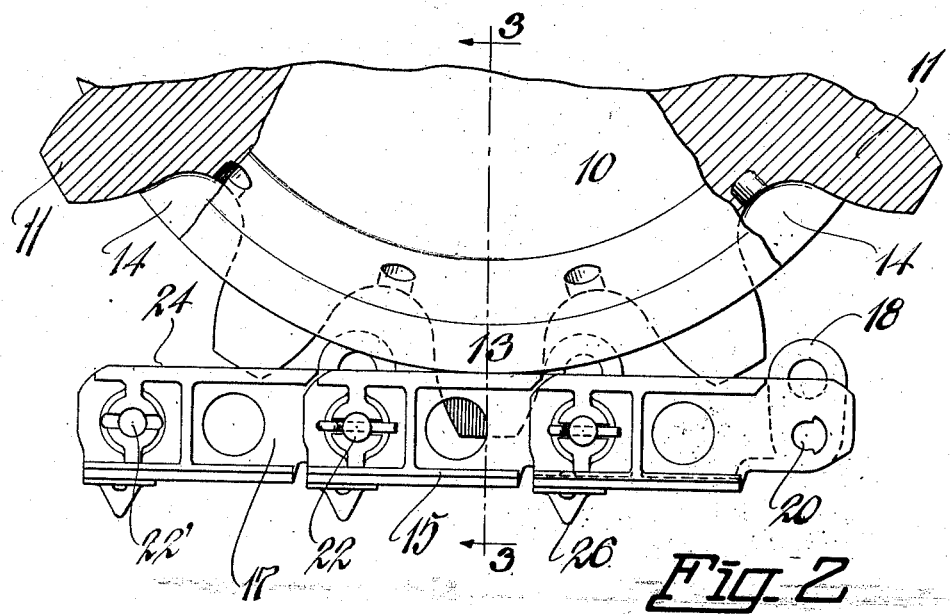
Figure 2 is an enlarged, detail view, in side elevation showing the relation between the driving sprocket and the portable endless track upon which the sprocket has a rolling movement.
Figure 3:
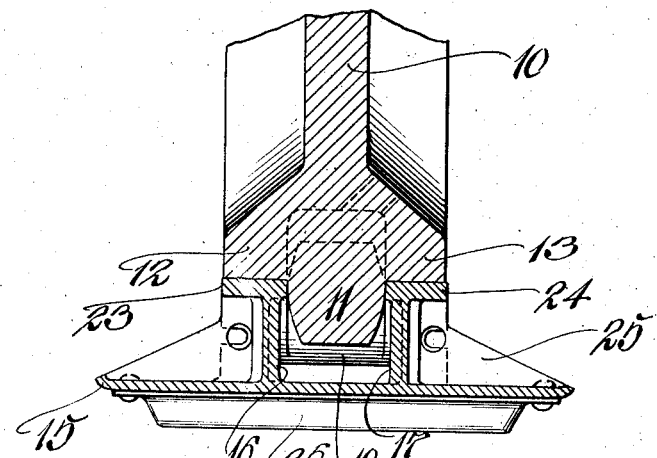
Figure 3 is a further enlarged, transverse, detail sectional view showing the sprocket or driving wheel on its track and in engagement with the sprocket-chain portion of the endless, portable track.

The power is applied to the traction member at the longitudinal center thereof between the two end supporting wheels, through the instrumentality of the transverse driving shaft 9, journaled in bearings 9' in the frame, and at each end of the shaft is fixed a driving sprocket wheel 10 for transmitting power to the portable belt or track member 1. The sprocket wheel is specially constructed with circumferential teeth 11, spaced in usual manner at the transverse center of the wheel, and at the sides of the row of sprocket teeth are provided complementary tread rims 12 and 13, which as best seen in Figure 2 have the same diameter as the pitch circle of the sprocket wheel teeth. These tread rims are of substantial width or thickness and are capable of supporting the sprocket wheel with a rolling motion of the lateral tread rims on the lower or ground flight of the endless belt or track, and between the teeth of the sprocket wheel are provided recesses 14 to permit the full load or weight of the traction machine to be borne by the tread rims on the portable track.

Figure 4:
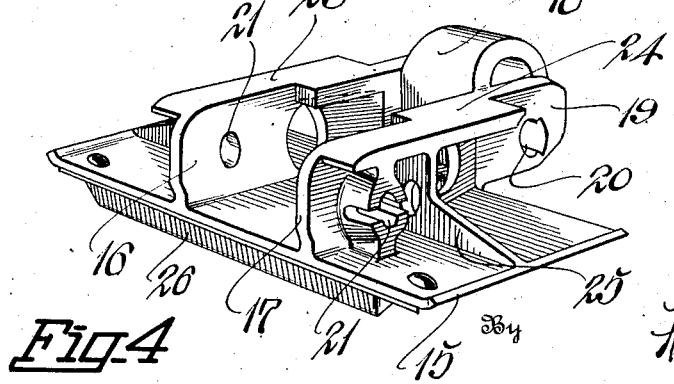
Figure 4 is a perspective view of one of the links of the portable track.

The track 1 is made up of cast metal links made of a standard form, and each comprising a transversely extending tread plate 15 of suitable dimensions and formed with a pair of spaced, vertical webs 16 and 17, which webs form the links of the sprocket chain for the sprocket wheel, and each pair of webs is joined, at the forward end of the link, by an integral, transversely extending bearing boss 18 located between the front extensions 19, 19 of the webs, which project beyond the front edge of the tread plate, as seen in Figure 4. The extensions 19, 19, overlap the succeeding tread plate and are located between the offset, preceding webs 16 and 17, and they are fashioned to permit the required turning movement about the wheels 2 and 3 of the jointed links of the belt or track. The forward end of each link is provided with a transverse opening 20 and the rear ends of the spaced webs 16 and 17 have alined bearing openings 21, 21 for the front and rear track pins 22 and 22' respectively that form the pivot joints between the hinged or pivoted links of the portable track.

The pair of parallel, spaced tracks for the rolling tread rims of the sprocket wheel are formed by the lateral flanges 23 and 24 on the tops of the webs 16 and 17, and because of the formation of the extensions 19 of the webs of the links, these flanges form continuous tracks or ways over which the sprocket may roll. In addition to the support afforded the flanges 23 24 by the bearing members 21 of the webs, they are further braced by laterally extending webs 25, which as seen in Figure 4 extend to the outside edges of the tread plates of the portable track member or belt.

The V-shaped grousers 26, are attached, one to each tread plate, under the bottom, and at a point slightly in advance of the vertical center line of the hinge joint or pin of the linked belt. As the sprocket wheel rolls forward, there is a tendency, under certain conditions, when the wheel leaves a link over which it has passed, for the link to slightly tip up and follow the sprocket wheel, but by locating the grouser in advance of the pivot point of the links the sprocket wheel passes over the joint leaving the rear link and onto the next link by which its load is supported before this objectionable movement can take place.

The bearing boss 18 is somewhat of an egg-shape in cross section, and the upper end is rounded to receive the push from the sprocket teeth, and by reference to Figures 2 and 4 it will be seen that the pitch line of the sprocket teeth, the tread or periphery of the two rims 12 and 13, the horizontal diameter of the circular-top boss and the line of the track, coincide, thus securing an intimate co-action between the sprocket tooth, and boss and the tread rims and track surface, which applies the power of the wheel to the track without loss of motion and without likelihood of slipping of the parts. This rolling of the sprocket wheel on its rims, of the exact pitch diameter of the sprocket teeth, on the track may be compared to the action of a rolling rack wheel on an integral, straight rack or toothed bar, as differentiated from the action of a sprocket and chain movement, with all the superiority of advantage in favor of the first action. The advantage of a track sprocket having its tread line and its tooth pitch line the same distance from the center of the sprocket, thus causing the sprocket to roll on its pitch line may be illustrated as follows. A sprocket having twelve teeth of 7" pitch, in one revolution would travel 84". With its tread line an equal distance from the center of the sprocket would have a tread line diameter of 26¾", which diameter has a circumference of 84.0378". Thus it is readily seen that there can be no slippage of the sprocket tread when the sprocket rolls along the track. In other words a sprocket having a tooth pitch line identical with the tread or rolling line has a constant circumferential and lineal travel, thus eliminating practically all friction and wear on the co-acting parts.

From the above description taken in connection with my drawings it will be apparent that I have secured a center drive sprocket wheel rolling on its pitch diameter and co-acting with the links of the portable endless track, in such manner as to insure a smooth travelling, free and easy motion for the parts, together with an efficient expenditure of power as it is transmitted from the driving sprocket to the track.

Having thus fully described my invention, what I claim as new and desire to secure by Letters Patent is—

1. The combination with a track having bearing members, of a sprocket wheel adapted to co-act with said members, and a tread rim on said wheel to roll on the track and of the same diameter as the pitch diameter of the sprocket wheel.

2. The combination with a linked track having bearing bosses, of a sprocket wheel adapted to co-act with said bosses, and a tread rim at each side of said sprocket wheel to roll on the track and of the same diameter as the pitch diameter of the sprocket wheel.

3. The combination with a portable track comprising pivoted links each having spaced flanges forming continuous parallel tracks, and each link fashioned with a transverse boss, of a sprocket wheel adapted to co-act with said bosses, and a tread rim at each side of said sprocket wheel to engage the parallel tracks, said tread rims being of the same diameter as the pitch diameter of the sprocket wheel.

In testimony whereof I affix my signature.

ARTHUR R. BLEWETT.